M. C. ROSENFELD.
COMBINED PIPE AND BEAM CLAMP.
APPLICATION FILED JULY 3, 1907.

913,772.

Patented Mar. 2, 1909.
2 SHEETS—SHEET 1.

Witnesses:

Inventor:
Mortimer C. Rosenfeld,
by A. E. Merkel.
his attorney

M. C. ROSENFELD.
COMBINED PIPE AND BEAM CLAMP.
APPLICATION FILED JULY 3, 1907.

913,772.

Patented Mar. 2, 1909.
2 SHEETS—SHEET 2.

Witnesses:

Inventor:
Mortimer C. Rosenfeld,
by A. E. Merkel
his attorney.

UNITED STATES PATENT OFFICE.

MORTIMER C. ROSENFELD, OF CLEVELAND, OHIO.

COMBINED PIPE AND BEAM CLAMP.

No. 913,772.　　　Specification of Letters Patent.　　　Patented March 2, 1909.

Application filed July 3, 1907. Serial No. 382,025.

*To all whom it may concern:*

Be it known that I, MORTIMER C. ROSENFELD, a citizen of the United States, resident of Cleveland, county of Cuyahoga, and State of Ohio, have invented a new and useful Improvement in a Combined Pipe and Beam Clamp, of which the following is a specification, the principle of the invention being herein explained and the best mode in which I have contemplated applying that principle, so as to distinguish it from other inventions.

My invention relates to means for supporting pipes and particularly to pipe-supporting means adapted to be secured to I or channel beams.

The object of such invention is to provide a supporting device of a character which may be readily attached and detached from a beam and which may be applicable to beams of varying sizes.

The said invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

Figure 4:
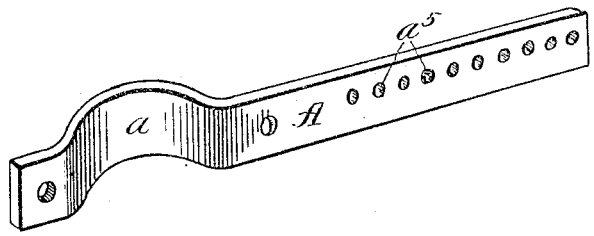
Figure 5:
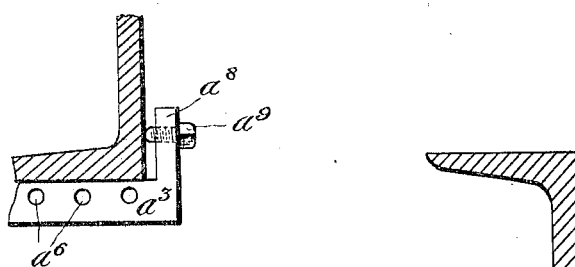
Figure 6:
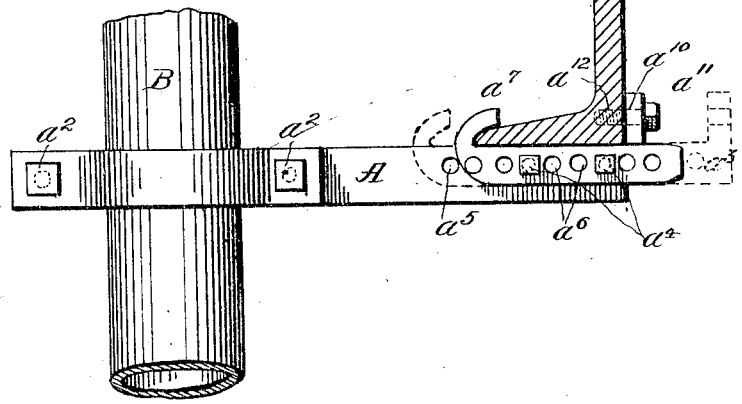

In said annexed drawings:—Figure 1 represents a perspective view of a combined pipe and beam clamp embodying my invention, showing a section of supported pipe in its secured position. Fig. 2 represents an elevation of such device showing a portion of such pipe and also an I-beam in section to which said support is secured. Fig. 3 represents a cross-sectional view of one end of the clamp. Fig. 4 represents a perspective view of the main member or stem of the clamp. Fig. 5 represents a detailed view illustrating a modified form of one of the clamping members, showing also a sectional portion of the channel beam to which such modified form of device is secured. Fig. 6 represents an elevation of a combined pipe and beam clamp showing a section of pipe supported thereby, and also a channel beam in section to which the clamp is secured, this figure illustrating a second modified form of clamp arranged to be applied to a channel beam.

Referring to the form of clamp illustrated in Figs. 1, 2 and 3, A is the main member or stem and is provided with a curved portion or seat $a$ for receiving the pipe B. A strap $a'$ is provided and is similarly formed with a curved seat. This strap is secured to the stem A by means of two bolts $a^2$ $a^2$ whereby it will be seen that the pipe may be firmly secured upon the stem. Upon the opposite end of the stem and upon opposite sides thereof are mounted two clamping members $a^3$ $a^3$ which are secured to the said stem by means of bolts $a^4$ $a^4$ passing through holes $a^5$ formed in the stem and holes $a^6$ formed in the clamping member. The clamping members and stem are respectively provided with a plurality of these holes, whereby it is seen that they may be adjusted and secured in various positions longitudinally along said stem. The inner end of the one member is formed with a projecting lip $a^7$ which is adapted to hook over and engage the edge portion of one side of the flange of the I-beam C as shown in Fig. 2. The opposite end of the other clamping member is similarly formed with a projection $a^7$ which is adapted to hook over and engage the opposite side of such flange.

It will be noted from the above construction that the clamp may be securely fastened to the I-beam flange and the two clamping members be adjusted to fit beams of varying sizes. By providing two such clamping members it will further be seen that the pipe may be supported at varying distances from the beam. In order to adjust the clamping members to fit varying sizes of beams they are moved in opposite directions and secured, and in order to vary the distance of the point of support from the beam, the two clamping members are moved in the same direction and secured, as will be readily understood.

In Fig. 5 I have, as before mentioned, shown a modified form of cramp. Such modification consists in providing the one clamping member with a perpendicular offset $a^8$ in which is mounted a set-screw $a^9$. The other clamping member is formed as in the first described structure. By means of this modification it will be seen that one clamping member may engage the edge portion of the channel flange and the other member, through the medium of said set-screw may be caused to engage the channel at a point opposite said edge portion. Instead of providing the off-set with a set-screw it may be provided with a hole $a^{10}$ through which passes a screw $a^{11}$ which screws into a threaded hole $a^{12}$ formed in the channel as shown in Fig. 6.

Other modes of applying the principle of my invention may be employed, instead of the one explained, and change may be made as regards the mechanism herein disclosed, provided the means covered by any one of the following claims be employed.

I, therefore, particularly point out and distinctly claim as my invention:—

1. In a combined pipe and beam clamp, the combination of a stem provided with a seat for receiving a pipe, a strap adapted to be secured to said stem and in conjunction with the latter, secure a pipe in said seat; two members mounted upon said stem, longitudinally adjustable therealong and adapted to engage opposite sides of a beam.

2. In a combined pipe and beam clamp, the combination of a stem provided with means for securing it to the pipe and with a multiplicity of perforations; two perforated clamping members mounted upon said stem parallel with the latter and adapted to engage opposite edges of the beam, and bolts passing through the perforations of the stem and clamping members for fixing same in said described parallel position.

Signed by me, this 27th day of June, 1907.

MORTIMER C. ROSENFELD.

Attested by:
WM. ROTHENBERG,
A. E. MERKEL.